United States Patent [19]

Hanrahan

[11] Patent Number: 5,066,025
[45] Date of Patent: Nov. 19, 1991

[54] BRUSH SEAL ASSEMBLY

[76] Inventor: Paul R. Hanrahan, 85 Songbird La., Farmington, Conn. 06032

[21] Appl. No.: 539,241

[22] Filed: Jun. 18, 1990

[51] Int. Cl.$^5$ .............................. F16J 15/48; F16J 9/00
[52] U.S. Cl. ....................................... 277/53; 277/47; 277/168; 277/178
[58] Field of Search ..................................... 277/53-57, 277/11, 47, 50, 178, 183, 168-172

[56] References Cited

U.S. PATENT DOCUMENTS

| | | | |
|---|---|---|---|
| 3,377,075 | 4/1968 | Feller | 277/53 |
| 4,202,554 | 5/1980 | Snell | 277/53 |
| 4,204,629 | 5/1980 | Bridges | 277/53 |
| 4,756,536 | 6/1988 | Belcher | 277/53 |

Primary Examiner—William A. Cuchlinski, Jr.
Assistant Examiner—Daniel G. DePumpo

[57] ABSTRACT

Support structure (12) includes a recess (32) which accepts short plate (20) of brush seal (10). The recess will not accept long plate (18) of the seal. Retaining ring groove (28) accepts the retaining ring (26) only if the seal is installed in the proper direction. Reverse installation is precluded without special machining of the brush seal.

2 Claims, 1 Drawing Sheet

BRUSH SEAL ASSEMBLY

DESCRIPTION

1. Technical Field

The invention relates to brush seals for sealing between a static structure and a rotating structure, and in particular to a construction for preventing reverse installation of the brush seal.

2. Background of the Invention

It is known to use a brush seal to establish a fluid seal between relatively movable parts. Typically the seal comprises a plurality of bristles or filaments which are trapped between two annular plates and extend inwardly toward the rotating component.

Since the bristles tend to be axially deflected along the shaft by the pressure differential, the annular plate on the low pressure side is usually long in the radial dimension as compared to the annular plate on the high pressure side. The bristles are usually not directed in radially, but are located at an angle with respect to this radius. The bristles by their inherent flexibility and resilience tend to remain in contact with the shaft while it rotates.

These bristles are secured at an angle with the direction of rotation to maintain the proper sliding relationship. Should the seal be installed in the reverse direction, these bristles will be facing into the direction of rotation. The frictional contact will tend to cause buckling of the bristles leading to damage and ultimate failure of the seal.

It is accordingly desirable that a foolproof method be provided to avoid inadvertent adverse installation of the seal.

SUMMARY OF THE INVENTION

A brush seal has an annular short side plate and an annular long side plate. A plurality of bristles are secured therebetween extending inwardly and inclined to the radial direction. The brush seal is located within a hollow cylindrical static support structure which concentrically surrounds a rotating cylindrical inner member. This member has a known direction of rotation and the bristles extend inwardly being inclined in the direction of rotation.

The support structure has an inside circular surface receiving the brush seal and an axially facing shoulder extending in from the circular surface. The shoulder has a recess in its face of a radial distance greater than the radial dimension of the short side of the seal but less than that of the long side of the seal. Accordingly, with proper installation of the seal the short side will fit within the recess.

A retaining ring groove exists in the inside circular surface a preselected distance from this recess. This groove is located so that a retention ring may be installed only if the brush seal is installed with the proper orientation.

DESCRIPTION OF THE PREFERRED EMBODIMENT

Figure 1:
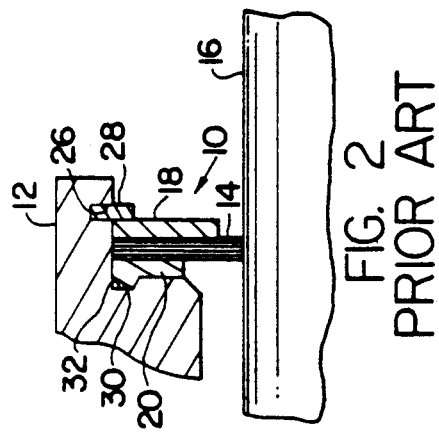
FIG. 1 is an illustration of a prior art arrangement.

FIG. 1 illustrates a prior art arrangement wherein a brush seal 10 is secured within a static structure 12. The bristles 14 of the brush seal are disposed at an angle from the radial direction and rest against the rotating member 16.

A long side plate 18 of the brush seal is located on the low pressure side and has a relatively long dimension in the radial direction. A short side plate 20 of the brush seal is located on the high pressure side and has a relatively short dimension in the radial direction.

Plate 18 accordingly serves to support the bristles against the high pressure, while the shortness of plate 20 permits more length of bristles 14 free for required resilient movement.

Pin 22 is permanently installed within a static structure 12. A corresponding opening 24 in the short plate of the brush seal receives the pin. With the brush seal installed in the proper direction, the pin passes into the opening so that retaining ring 26 may be installed within retaining ring groove 28. Reverse installation is not permitted because of the pin.

Figure 2:
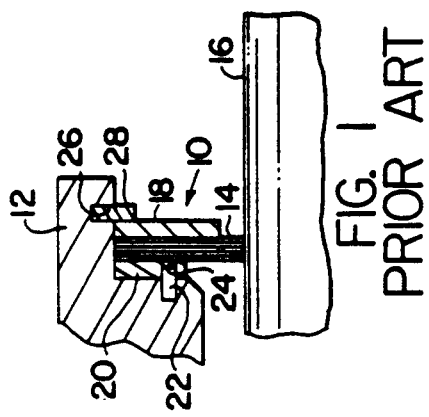
FIG. 2 is an illustration of another prior art arrangement.

FIG. 2 illustrates an alternate prior art arrangement. Again, the brush seal 10 is located within static structure 12 with bristles 14 resting against the rotating member 16. The short side plate 20 has a lip 30 machined thereon. Recess 32 in the static structure permits the lip to fit within the groove 32. In the event that reverse installation is attempted, retaining ring 26 could not be installed since it would interfere with lip 30. Each of the misassembly features of the prior art require special machining. In FIG. 1 the hole 24 must be provided in addition to pin 22 and the machining of the pin securing opening within the static structure 12. In the FIG. 2 embodiment, lip 30 must be machined on the brush seal. These misassembly features on the seal add to the cost that should be avoided if possible.

Figure 3:
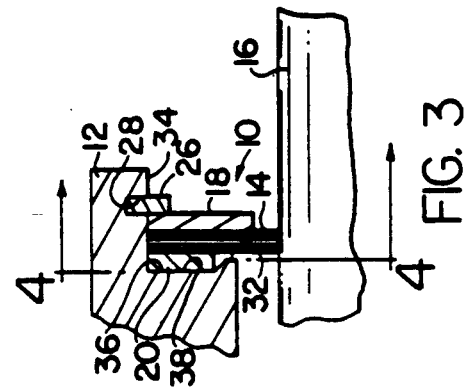
FIG. 3 illustrates the brush seal assembly of the invention.

In FIG. 3 the brush seal 10 includes long plate 18 and a short plate 20, each being annular plates. Bristles 14 are secured therebetween as a portion of the brush seal. These bristles again bear against the rotating member 16 for the purpose of sealing between the static structure 12 and the rotating member or shaft 16. The static structure 12 has an axially facing shoulder 32 extending inwardly from the inside circular surface 34 which receives the brush seal. Recess 36 is machined within the shoulder with this recess having a radial distance greater than the radial dimension of short side 20. This distance of the recess is also less than the radial dimension of the long side 18. Accordingly, only when installed in the proper direction will the seal rest against the surface of the recess.

The retaining ring groove 28 is located a distance from the recessed surface 38 of the recess a distance greater than the thickness of the brush seal 10. It is also located a distance from the shoulder 32 a distance less than the thickness of brush seal 10. Accordingly, retaining ring 26 in the form of either a snap ring or a double spiral wire may be installed only with a seal 10 located in the proper direction with short side 20 of the seal fitting within recess 36.

Figure 4:
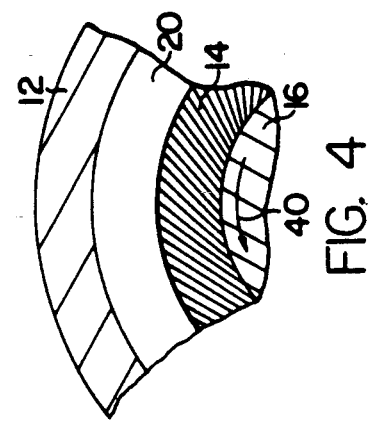
FIG. 4 is a sectional axial view of the seal.

FIG. 4 illustrates the orientation of bristles 14 where they are inclined in the direction of rotation 40 of rotating member 16.

Figure 5:
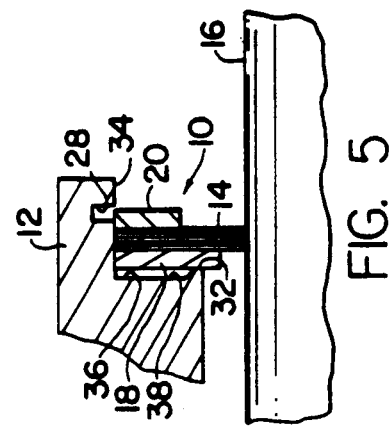
FIG. 5 is an illustration showing improper installation of the seal.

In FIG. 5 there is illustrated an attempted reverse installation of the seal. It can be seen that with long side 18 now abutting shoulder 32 a retaining ring is not capable of being installed in groove 28.

I claim:

1. A brush seal assembly comprising:

a rotatable cylindrical inner member having a known direction of rotation and a cylindrical seal surface;

a brush seal having an annular short side plate, an annular long side plate and a plurality of bristles secured therebetween, said bristles extending inwardly and inclined to the radial direction;

a hollow cylindrical support structure concentrically surrounding said shaft;

said support structure having an inside circular surface of a diameter commensurate with the outside diameter of said brush seal, for receiving said brush seal;

an axially facing shoulder extending radially inwardly from said inside circular surface, and having a recessed surface therein from said inside circular surface a distance greater than the radial dimension of said short side, but less than the radial dimension of said long side;

a retention ring;

a retention ring groove for receiving said retention ring in said inside circular surface a distance from said recessed surface greater than the thickness of said brush seal, and also located a distance from said shoulder less than the thickness of said brush seal; and said bristles inclined in the direction of cylindrical inner member rotation when said brush seal is installed with said short side in said recess.

2. A brush seal assembly as in claim 1:

the depth of said recess being less than the thickness of said short side plate.

* * * * *